United States Patent [19]

Thioux et al.

[11] Patent Number: 4,984,853
[45] Date of Patent: Jan. 15, 1991

[54] BRAKING CORRECTOR GOVERNED BY THE HEIGHT OF A VEHICLE

[75] Inventors: Alain Thioux, Bry Sur Marne; Roland Levrai, Stains, both of France

[73] Assignee: Bendix Europe Services Techniques, Drancy, France

[21] Appl. No.: 465,681

[22] Filed: Jan. 16, 1990

[30] Foreign Application Priority Data

Jan. 31, 1989 [FR] France ............................. 89 01155

[51] Int. Cl.⁵ ............................................... B60T 8/22
[52] U.S. Cl. .................................... 303/22.8; 188/195
[58] Field of Search ................... 303/22.1, 22.8, 9.69, 303/22.4, 22.7, 22.6; 188/195, 349

[56] References Cited

U.S. PATENT DOCUMENTS

| | | | |
|---|---|---|---|
| 3,695,735 | 10/1972 | Guettier | 188/195 X |
| 3,811,738 | 5/1974 | Carre | 303/22.1 |
| 3,840,280 | 10/1974 | Watanabe | 188/195 X |
| 4,270,807 | 6/1981 | Young | 188/195 X |
| 4,332,423 | 6/1982 | Schopper et al. | 188/195 X |
| 4,427,239 | 1/1984 | Reinhartz et al. | 188/195 X |
| 4,639,048 | 1/1987 | Schopper et al. | 303/22.1 |
| 4,648,489 | 3/1987 | Schmoelzer | 303/22.1 X |
| 4,673,224 | 6/1987 | Schmoelzer | 303/22.8 X |
| 4,750,786 | 6/1988 | Adachi et al. | 303/22.8 X |
| 4,915,457 | 4/1990 | Schopper | 303/22.8 |

FOREIGN PATENT DOCUMENTS 1906372 11/1962 Fed. Rep. of Germany.
3315763 10/1984 Fed. Rep. of Germany.
2534208 4/1984 France.

Primary Examiner—Douglas C. Butler
Attorney, Agent, or Firm—Larry J. Palguta; Ken C. Decker

[57] ABSTRACT

A braking corrector governed by the height of a vehicle, comprises a body (10), in which is slideably mounted at least one piston controlled by an actuating rod (12) and arranged so as to interact with at least one valve element, in order to control at least one brake-fluid passage between at least one inlet (14,16) and at least one outlet (18,20) of the corrector. The corrector possesses a sensor detecting the height of the vehicle and formed from a lever (32), the pivot (34) of which is stationary relative to the body (10) of the corrector and one end (36) of which is connected to an unsuspended part of the vehicle, the distance between this end (36) and the pivot (34) defining a first lever arm, and the lever (32), which actuates the actuating rod (12) at a distance from the pivot (34), defining a second lever arm. The corrector possesses a mechanism (40,46,48,54) for varying the ratio between the lengths of the first and second lever arms.

2 Claims, 2 Drawing Sheets

BRAKING CORRECTOR GOVERNED BY THE HEIGHT OF A VEHICLE

BACKGROUND OF THE INVENTION

The present invention relates to braking correctors and, more particularly, to such correctors governed by the height of a vehicle.

It is known that it is desirable to connect such a braking corrector directly to the suspension of a vehicle, in order to vary the braking of the wheels of a vehicle as a function of its height which is itself usually a function of its load.

Such correctors are well known in the art of braking and typically comprise a body, in which is slideably mounted at least one piston controlled by an actuating rod and arranged so as to interact with at least one valve element in order to control at least one brake-fluid passage between at least one inlet and at least one outlet of the corrector, the corrector possessing a sensor detecting the height of the vehicle and formed from a lever, the pivot of which is stationary relative to the body of the corrector and one end of which is connected to an unsuspended part of the vehicle, the distance between this end and the pivot defining a first lever arm, and the lever, which actuates the actuating rod at a distance from the pivot, defining a second lever arm.

Likewise conventionally, the connections between the lever and the actuating rod or the unsuspended part of the vehicle are made by elastic means, such as springs, so as to obtain a corrector-actuating force which is proportional to the distance between the suspended and unsuspended parts of the vehicle as a function of the rigidity of the spring.

It can happen that springs produced in large series have a considerable spread of their characteristics, especially their rigidity, which has a direct influence on the functioning of the corrector. Thus, in some cases, the activation pressure of the corrector can be well beyond acceptable tolerance limits.

Because it is not feasible to machine a spring on an industrial scale, it is therefore necessary to adjust the rigidity of the spring or its conditions of use.

The French Pat. No. FR-A-2,534,208 makes known a braking corrector of the type recalled above, possessing means of calibration at the time of assembly of the vehicle. These calibration means consist of an auxiliary element located between one of the ends of the spring for connection to the unsuspended masses, and an element of the unsuspended masses. This auxiliary element consists of a bent lever which is articulated on the unsuspended element and of which one of the arms carries a log for the fastening of the spring and the other arm can be locked in position of the unsuspended element by means of a screw engaged into a slot made in this other arm.

This device has several disadvantages. First of all, it requires an intermediate piece, the fastening of which experiences tangential shearing forces and is therefore fragile. Moreover, it makes it possible only with difficulty to carry out a fine adjustment of the prestress exerted on the spring. Finally, the main disadvantage of this corrector is that the adjustment is made only after it has been installed on the vehicle, thus necessitating additional and complicated manipulations for the mechanic during the assembly of the vehicle.

SUMMARY OF THE INVENTION

It is therefore an object of the present invention to provide a corrector of reliable design, the activation point of which is independent of the rigidity of the spring and which can be adjusted during its manufacture, so that it merely needs to be fastened to the vehicle without additional adjustment.

To achieve this, the invention provides a corrector of the type recalled above, in which the lever possesses means for varying the ratio between the length of the lever arm determined by the distance between the pivot and the fastening point of the lever to an unsuspended part of the vehicle and that of the lever arm determined by the distance between the pivot and the bearing point of the lever on the actuating rod of the corrector.

BRIEF DESCRIPTION OF THE DRAWINGS

The invention will now be described by way of examples in relation to the accompanying drawings in which.

DETAILED DESCRIPTION OF THE INVENTION

Figure 1:
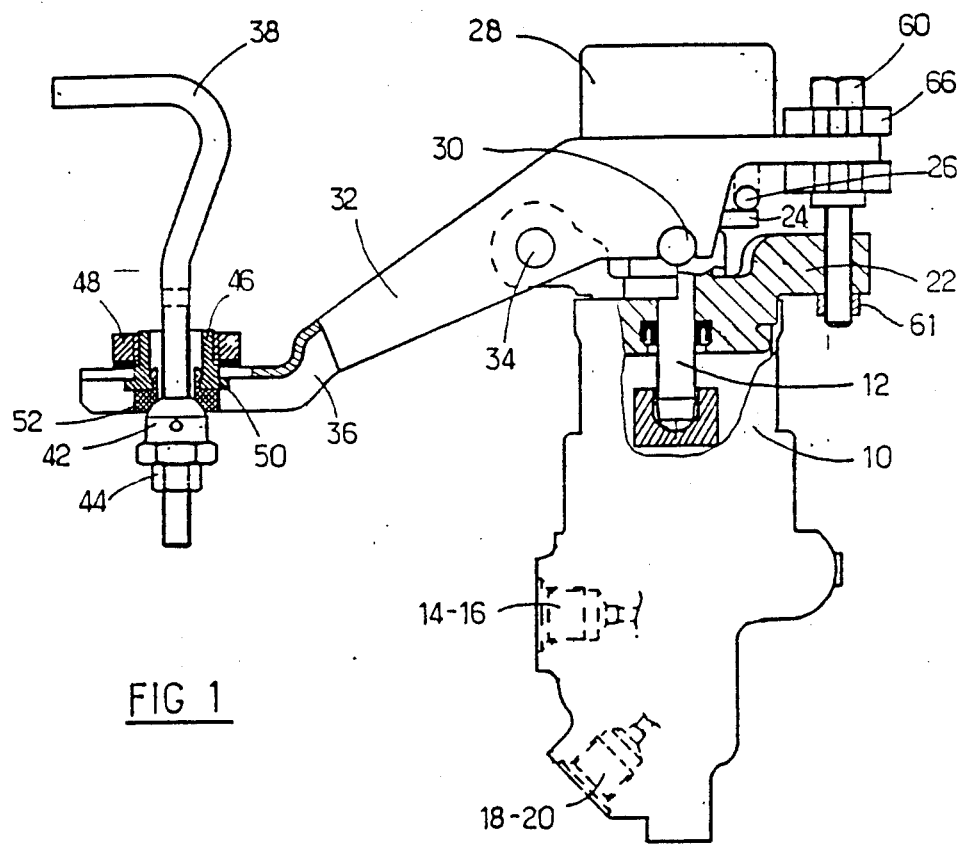
FIG. 1 shows a first embodiment of a corrector according to the invention diagrammatically in partial section.

FIG. 1 shows a braking corrector of conventional design, the function of which will not be described in detail because it is well known to an average person skilled in the art. This corrector comprises a body 10 which, in the example illustrated, contains two pistons controlled by an actuating rod 12. These pistons each control valves located between the inlet ports 14, 16 and outlet ports 18, 20, respectively, in order to modulate the pressure of the brake fluid at the outlets 18, 20 as a function of the pressure at the inlets 14, 16 and of the load of the vehicle.

To this purpose, the actuating rod 12 passes through the cover 22 of the body 10, from which it projects. A cup 24 engages that end of the rod projecting from the cover 22 at a sufficient distance from the latter to ensure that, during the movement of the rod 12, it cannot come up against the cover 22.

A compression spring 26 bears, on the one hand, on the cup 24 and, on the other hand, on the bottom of a piece 28 of general cylindrical form, having two diametrically opposite wings on which are formed journals 30 extending radially outwards and received in corresponding receptacles of a lever 32 for detecting the height of the vehicle suspension. Preferably, the pivot 34 of the lever is integral with the body 10 of the corrector and therefore with the chassis, while one end 36 of the lever is connected to an unsuspended point of the vehicle by means of a rod 38.

To allow for the spread of the rigidity values among different springs, according to the invention, the activation point of the corrector is preadjusted as a function of the rigidity of the spring 26 by carrying out the adjustment of the actuating stroke of this spring in order thereby to obtain a dynamic adjustment. This purpose is achieved by varying the ratio between the length of the lever arm determined by the distance between the pivot of the lever and the fastening point of the lever to an unsuspended part of the vehicle and the length of the lever arm determined by the distance between the pivot and the bearing point of the lever on the actuating rod of the corrector. The lever possesses a sliding piece which is itself connected to an unsuspended part of the vehicle and which will be immobilized on the lever in the position corresponding to the desired activation pressure for a given height of the vehicle.

Figure 2:
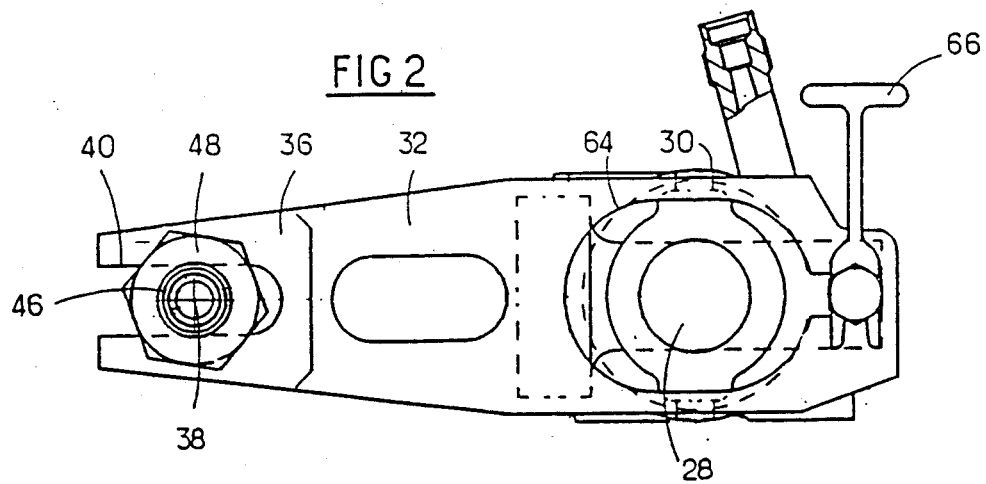
FIG. 2 is a top view of the corrector of FIG. 1.

FIG. 1 shows a corrector produced according to the invention, equipped with a lever 32, which end 36 intended to be connected to an unsuspended part of the vehicle is shaped so as to have a longitudinal aperture 40 (FIG. 2) open towards the end farthest from the pivot 34.

The rod 38 for connection to an unsuspended part of the vehicle has a thread on its end intended for interacting with the lever 32. Screwed onto this thread is a nut 42 which has a part of general hemispherical form and which can be retained in position on the rod 32 by means of locknut 44.

The longitudinal aperture 40 receives a fastening element provided on the rod 38, and formed from a system composed of a tubular screw 46 and a nut 48. The tubular screw 46 has an outside diameter slightly smaller than the width of the longitudinal aperture 40 and possesses a collar 50 intended for coming to bear on that face of the lever opposite the one on which the nut 48 bears.

Furthermore, the tubular screw 46 is fixed to a piece 52, itself tubular, having a hemispherical concave recess of a form substantially matching that of the hemispherical part of the nut 42.

It will therefore be appreciated that, by means of the invention, the corrector can easily be preadjusted immediately after its assembly, as follows.

The end 36 of the lever 32 is equipped with a screw/nut system 46, 48. An increasing hydraulic pressure is applied to the inlet ports 14, 16 of the corrector, and this pressure is measured at the outlet ports 18, 20, the lever being in a first position predetermined in relation to the body of the corrector. The same measurement is repeated for a second position of the lever which is likewise predetermined. A reading of the curves of the inlet pressure in relation to the outlet pressure which are obtained during these two measurements, makes it possible to determine the two activation points of the corrector and the rigidity of the spring 26.

If the values found are incorrect, the shift of the screw/nut system 46, 48 in the aperture 40 makes it possible to compensate the difference in rigidity of the spring 26 by a difference in the length of the lever arm between the pivot 34 and the fastening point of the rod 38.

The screw/nut system 46, 48 is then immobilized in this position by tightening the nut 48 on the screw 46, these then gripping the end 36 of the lever 32 between them.

The lever 32 is subsequently immobilized in a rest position by means of a key 66 and a system which is composed of a screw 60 and of a locknut 61 and which is fixed to the cover 22 and extends through an extension of the orifice 64 made in the lever 32 in order to allow the passage of the piece 28. The corrector is thus preadjusted perfectly in the workshop and from then on can be installed on a vehicle without any additional adjustment. For this purpose, once the corrector has been fastened to a suspended part of the vehicle, it is sufficient to cause the rod 38 for connection to an unsuspended part of the vehicle to pass through the screw 46. The nut 42 is then screwed onto the threaded end of the rod 38, until its hemispherical part comes to rest in the matching concave recess formed in the piece 52 fixed to the screw 46. The nut 42 is then immobilized in this position by means of the locknut 44. It is then sufficient to remove the key 66 in order to release the lever 32 and make the corrector operational, without any additional manipulation and whatever the characteristics of the spring 26.

Figure 3:
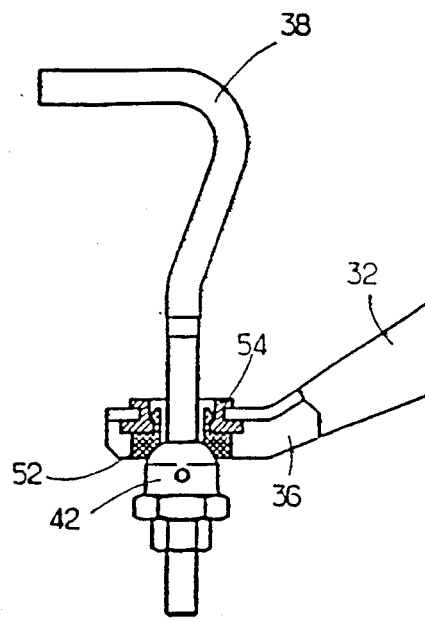
FIG. 3 shows the end of the lever according to a second embodiment of a corrector according to the invention diagrammatically in partial section.
Figure 4:
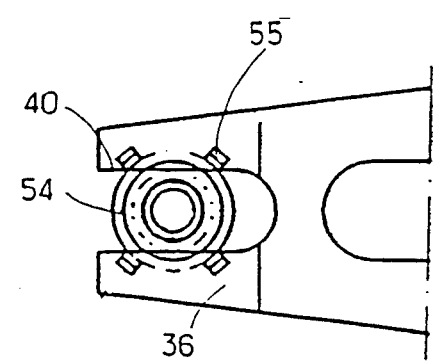
FIG. 4 is a top view of the end of the lever of FIG. 3.

FIGS. 3 and 4 illustrate a second embodiment of the element for fastening the rod 38 to the end 36 of the lever 32. This fastening element consists of a washer 54 of an outside diameter larger than the width of the longitudinal aperture 40 and, on its outer periphery, having an annular groove of a thickness slightly larger than that of the end 36 of the lever and of a diameter slightly smaller than the width of the longitudinal aperture 40, so as to allow the washer 54 to slide in the aperture 40. As before, the washer 54 is fixed to a tubular piece 52 having a hemispherical concave recess of a form matching that of the hemispherical part of the nut 42.

According to this embodiment, the dynamic adjustment of the activation point as a function of the characteristics of the spring 26 is made by shifting the washer 54 in the aperture 40, until the ideal position is obtained, the washer 54 then being immobilized in this position by making set-in deformations 55 by means of a suitable tool, such as a punch, in the end 36 of the lever 32 and preferably on those edges of the aperture 40 adjacent to the washer 54.

Figure 5:
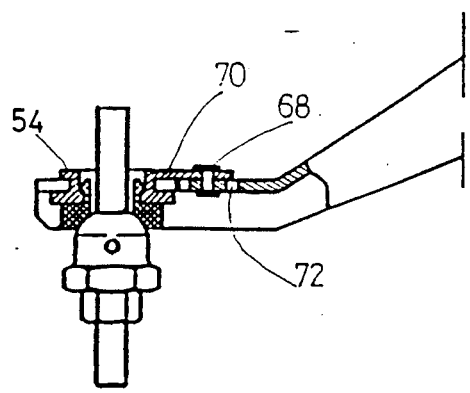
FIG. 5 shows the end of the lever according to a third embodiment of a corrector according to the invention diagrammatically in partial section.

FIG. 5 illustrates a third embodiment of the element fastening the rod 38 to the end 36 of the lever 32, where the adjustment is no longer made continuously, as in the embodiments described above, but discreetly in predetermined positions. For this purpose, the washer 54 possesses a part 70 partially covering the end 36 of the lever. In this part and in the lever will be formed holes 72 which coincide with one another in certain positions, and in which a rivet 68 can be inserted and clenched in order to immobilize the two pieces in the selected position.

It is clear that the invention is not limited to the embodiments described, but is capable of having many modifications, without departing from its scope. Thus, the invention is also used for a corrector with a simple hydraulic circuit and for a corrector which is connected to an unsuspended part of the vehicle by means of a spring.

What we claim is:

1. A braking corrector governed by the height of a vehicle, comprising a body in which is slideably mounted at least one piston controlled by an actuating rod and arranged so as to interact with at least one valve element in order to control at least one brake-fluid passage between at least one inlet and at least one outlet of the corrector, the corrector including a sensor detecting the height of the vehicle and formed from a lever the pivot of which is stationary relative to the body of the corrector and one end of which is connected to an unsuspected part of the vehicle, a distance between the one end and the pivot defining a first lever arm, and the lever, which actuates the actuating rod at a distance from the pivot, defining a second lever arm, said corrector further including means for varying the ratio between the lengths of the first and second lever arms, the means for varying the ratio between the lengths of the first and second lever arms provided at the one end of the lever connected to the unsuspended part of the vehicle, the one end of the lever having a longitudinal aperture receiving initially slideably a washer which is secured selectively in position in the aperture to define the length of the first lever arm, the washer having an annular groove disposed in registry with the longitudinal aperture, a tubular piece connected with said washer, the washer and tubular piece having passing therethrough a rod connected to the unsuspended part of the vehicle, a nut attached to the rod and having a hemispherical part mated with a hemispherical recess of the tubular part, the washer secured in position in the aperture by means of set-in deformations made at edges of the aperture and adjacent the washer.

2. A braking corrector governed by the height of a vehicle, comprising a body in which is slideably mounted at least one piston controlled by an actuating rod and arranged so as to interact with at least one valve element in order to control at least one brake-fluid passage between at least one inlet and at least one outlet of the corrector, the corrector including a sensor detecting the height of the vehicle and formed from a lever the pivot of which is stationary relative to the body of the corrector and one end of which is connected to an unsuspended part of the vehicle, a distance between the one end and the pivot defining a first lever arm, and the lever, which actuates the actuating rod at a distance from the pivot, defining a second lever arm, said corrector further including means for varying the ratio between the lengths of the first and second lever arms, the means for varying the ratio between the lengths of the first and second lever arms provided at the one end of the lever connected to the unsuspended part of the vehicle, the one end of the lever having a longitudinal aperture receiving initially slideably a washer which is secured selectively in position in the aperture to define the length of the first lever arm, the washer having an annular groove disposed in registry with the longitudinal aperture, a tubular piece connected with said washer, the washer and tubular piece having passing therethrough a rod connected to the unsuspended part of the vehicle, a nut attached to the rod and having a hemispherical part mated with a hemispherical recess of the tubular part, the washer including a part partially covering the one end of the lever, the washer being immobilized at the one end by means of at least one rivet means which engages the one end.

* * * * *